Oct. 2, 1962
R. K. NOLTE
3,056,414
ARTICLE WASHING MACHINE
Filed Dec. 30, 1960
6 Sheets-Sheet 1
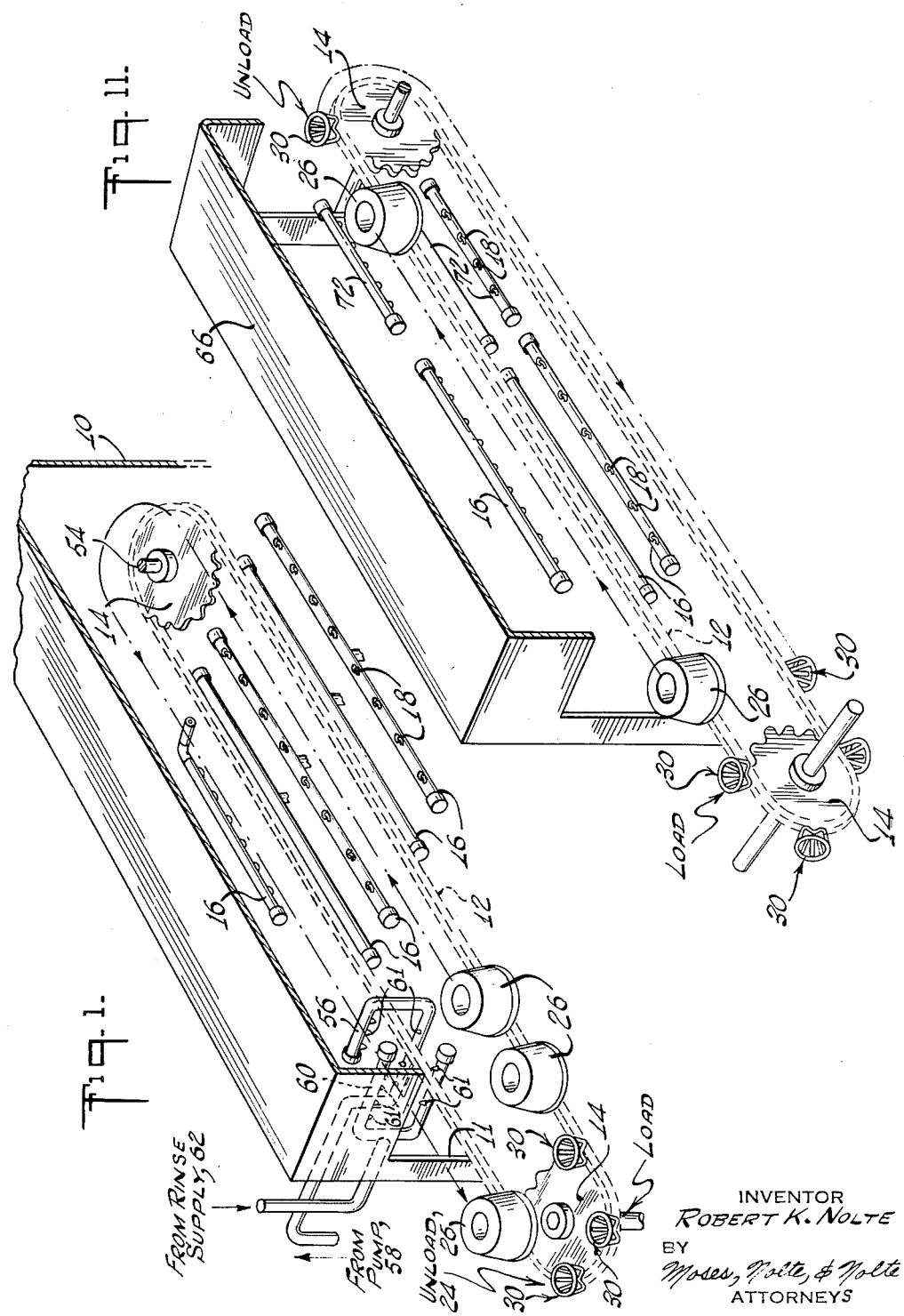
INVENTOR
ROBERT K. NOLTE
BY
Moses, Nolte, & Nolte
ATTORNEYS

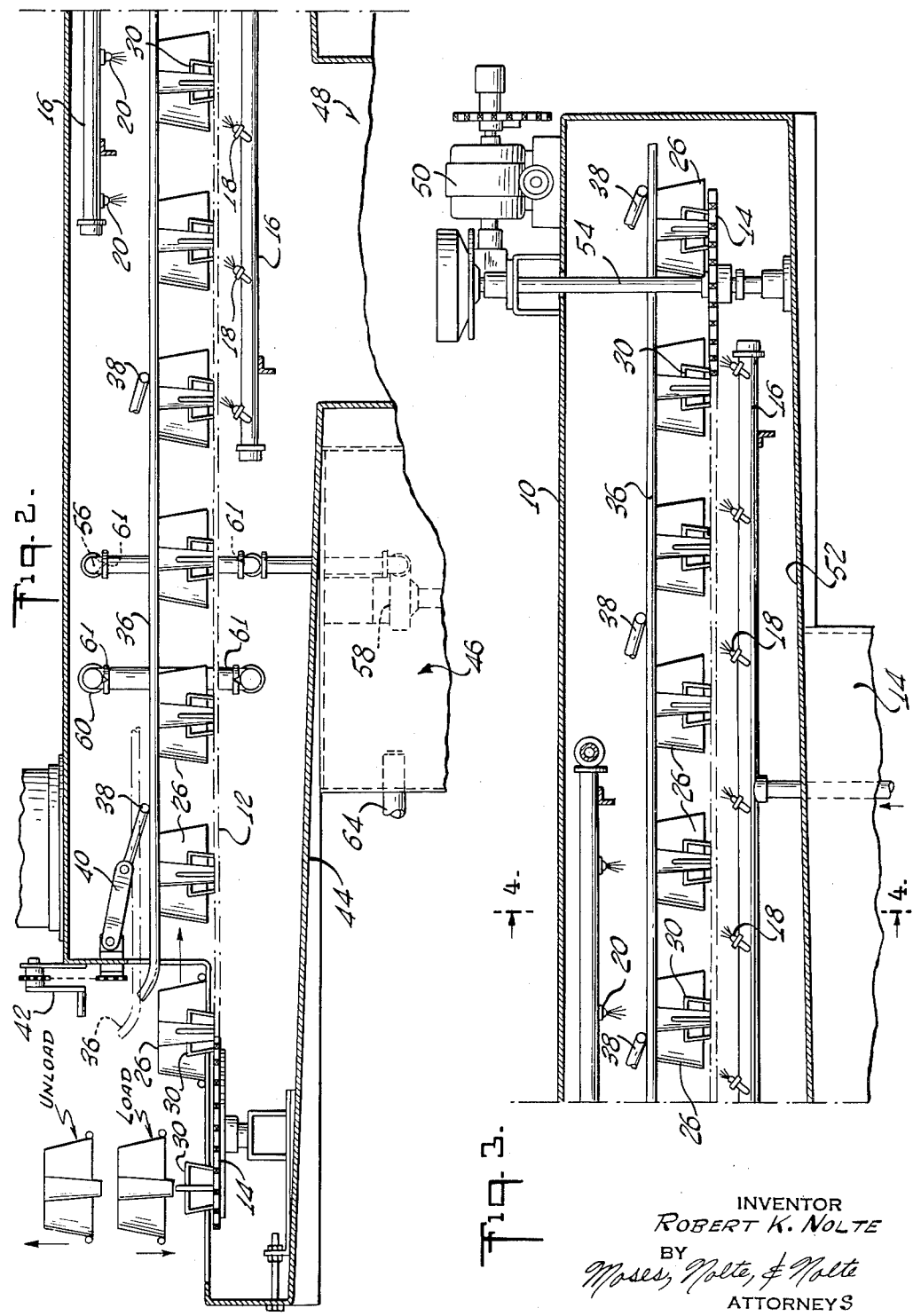

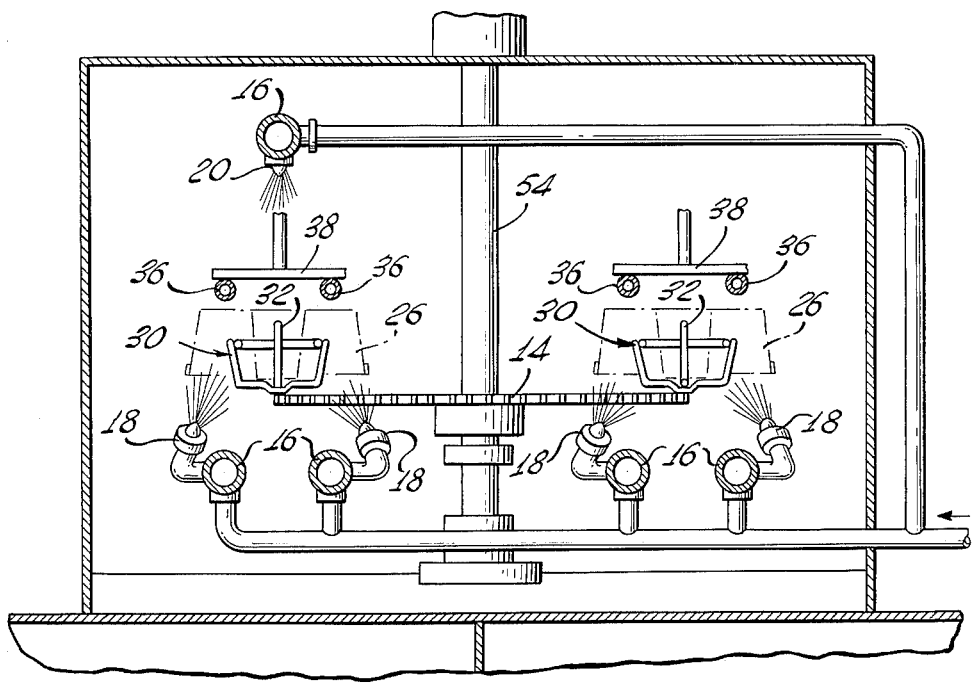
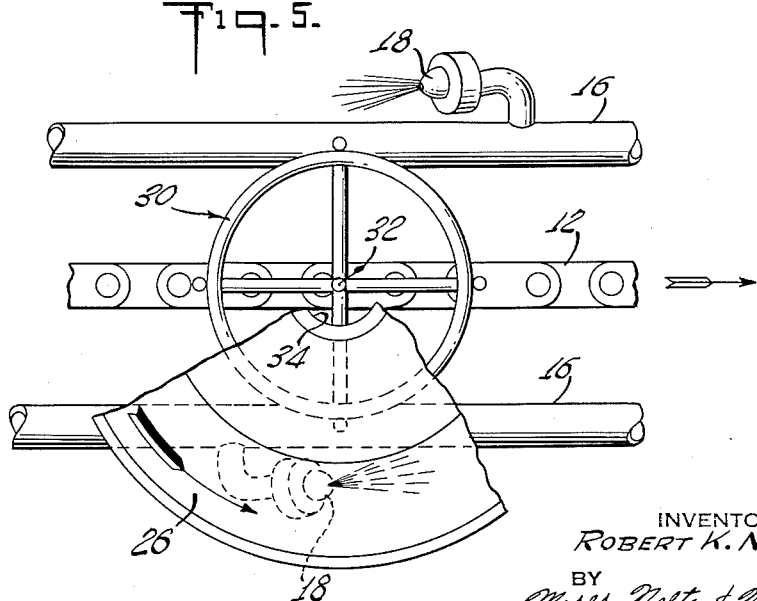

INVENTOR
ROBERT K. NOLTE
BY
Moses, Nolte, & Nolte
ATTORNEYS

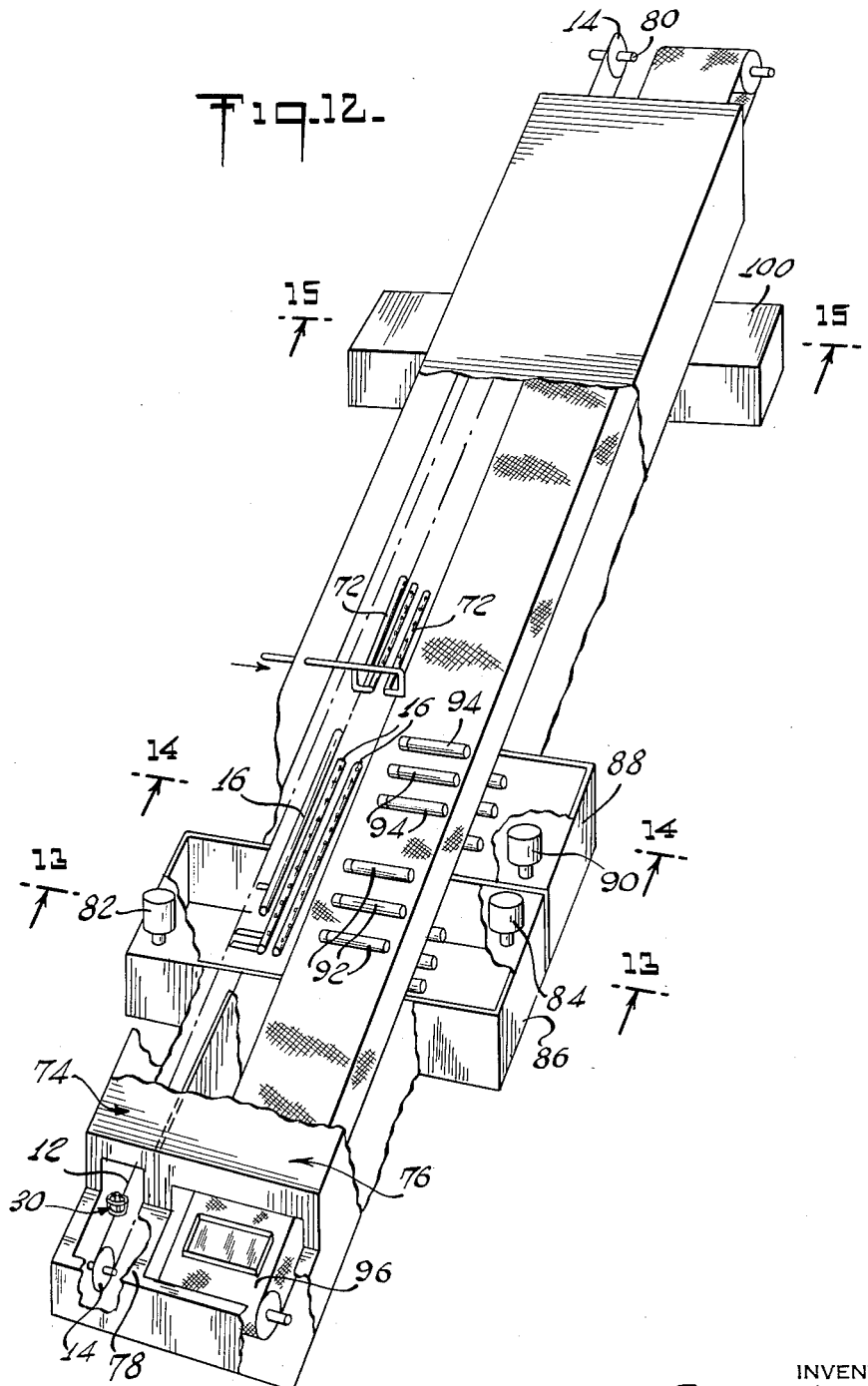

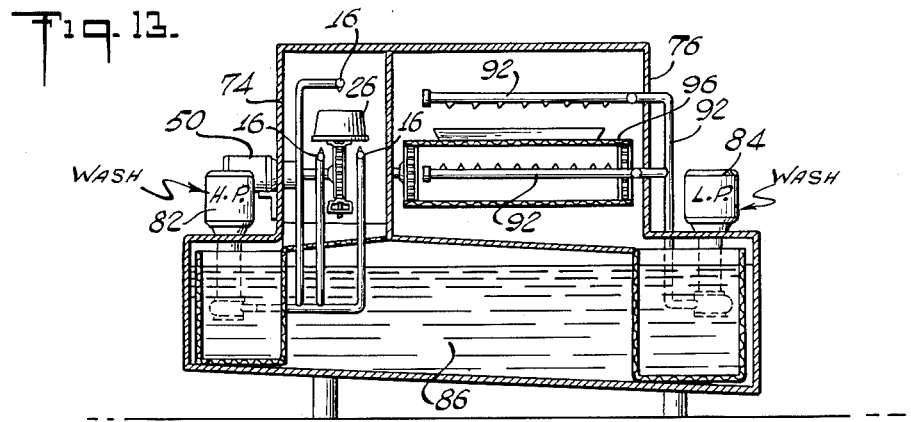
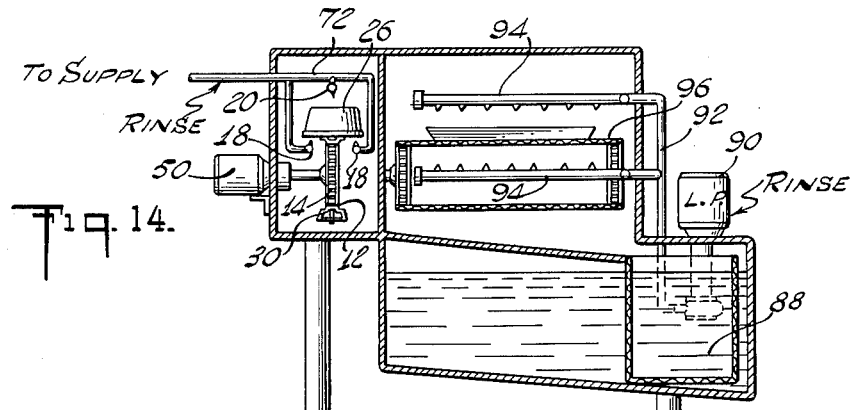
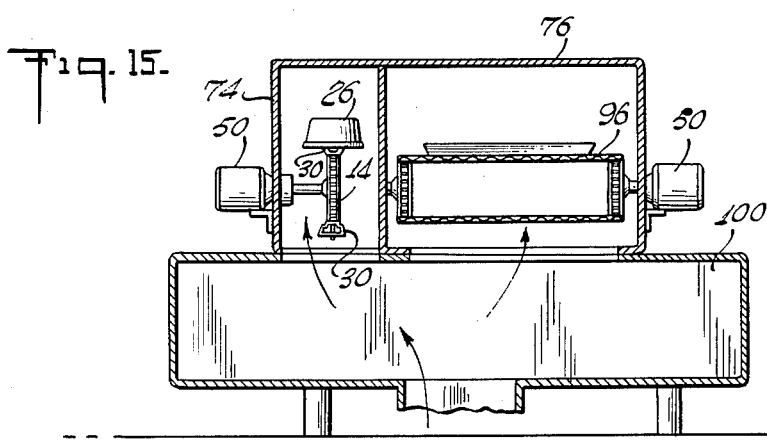

United States Patent Office 3,056,414
Patented Oct. 2, 1962

3,056,414
ARTICLE WASHING MACHINE
Robert K. Nolte, Chatham, N.J., assignor to Metalwash
Machinery Company, Elizabeth, N.J., a copartnership
Filed Dec. 30, 1960, Ser. No. 79,609
6 Claims. (Cl. 134—69)

This invention relates to washing machines in general, and in particular, to an improved bakery pan washing machine to cleanse pans having a cylindrical center portion used to core a hole in bakery products.

The machine of the invention is particularly adaptable to cleaning a pan used in the baking of an angel-food cake ring. This type cake is usually characterized by a center hole and also by a relative high egg white content. The characteristic shape of the pan, and the stickiness of the baked egg white residues have in the past made machine cleaning difficult and at best marginal. The present invention is designed to overcome the difficult cleansing problems involved with this general configuration pan and employs a novel pan mount and high pressure wash water directing means which causes the pans to rotate while traveling on a moving conveyor within the washing machine.

It is therefore an important object of the invention to provide an improved pan cleansing machine which rotatably mounts ring type baking pans in inverted fashion and rotates said pans during the washing cycle.

Another object of the invention is to provide an improved cleansing machine which employs the inclined or tangential impingement of high pressure washing streams upon the pan to thereby rotatae the pan to advance uncleansed surfaces thereof into the field of the washing stream.

A still further object of the invention is to provide a pan washing machine employing a two stage rinse wherein the first stage rinse uses the water collected from the second stage rinse drain.

Another object of the invention is to provide an improved pan washing machine employing high pressure and high temperature jet sprays to efficiently clean unusually adhesive baking residues from circular or doughnut-shaped pans.

Another object of the invention is to provide an improved angel-food pan washing machine of the character described in combination with a conventional pan washing machine wherein common washing and drying chambers are used.

Another object of the invention is to provide a combined angel-food cake and flat cake pan washing machine.

Other objects and advantages of the invention will become apparent and the invention will be fully understood from the following description and drawings, in which:

FIG. 1 is a schematic perspective view with portions broken away of the invention;

FIG. 2 is a partial elevation view in section of the embodiment of FIG. 1;

FIG. 3 is a partial elevation view in section of the right hand portion of the embodiment of FIG. 1;

FIG. 4 is a cross sectional view taken along line 4—4 of FIG. 3;

FIG. 5 is an enlarged top plan view of a support bracket and pan with portions broken away;

FIG. 11 is a perspective view with portions broken away showing another embodiment of the invention;

FIG. 12 is a perspective view of another embodiment of the invention with portions broken away;

FIG. 13 is a sectional view taken along line 13—13 of FIG. 12;

FIG. 14 is a cross sectional view taken along line 14—14 of FIG. 12; and

FIG. 15 is a cross sectional view taken along line 15—15 of FIG. 12 showing the drying chamber of the invention.

Figure 6:
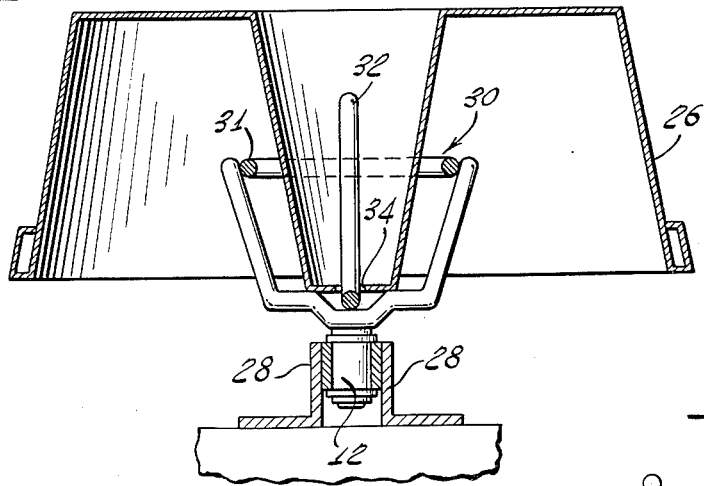
FIG. 6 shows a cake pan in cross section mounted upon a support bracket of the invention.
Figure 7:
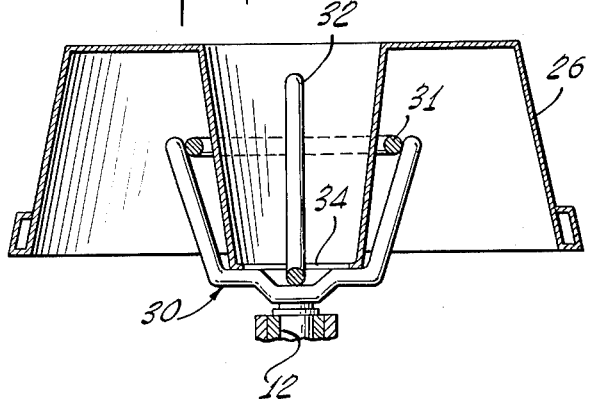
FIG. 7 is a sectional view of another style cake pan having a larger center core.
Figure 8:
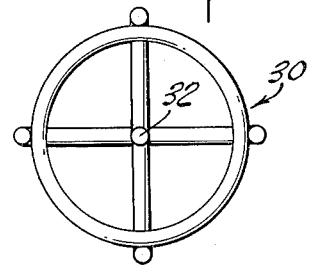
FIG. 8 is a top plan view of the pan support bracket shown in FIGS. 6 and 7.

Referring to FIGS. 1 to 10 of the drawings, a machine housing 10 has therein an endless conveyor chain 12 mounted about a pair of end sprockets 14. One end of the conveyor 12 extends outside the housing 10 through an entrance way 11 to provide a baking pan loading and unloading section. The sprocket 14 within the housing 10 is suitably driven by a motor 50 through conventional gearing and a vertically disposed drive shaft 54 (FIG. 3). Longitudinally disposed along the conveyor path are a plurality of high pressure washing water supply headers 16. Two headers are employed below the conveyor path to direct high pressure sprays upwardly into the interior of the inverted cake pan while an upper header is employed directly over the conveyor path to direct washing water downward over the pan exterior (FIG. 4).

Figure 9:
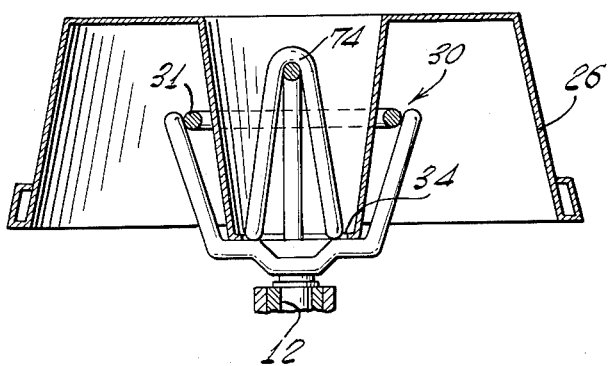
FIG. 9 is a side elevation view of another form of pan support bracket.
Figure 10:
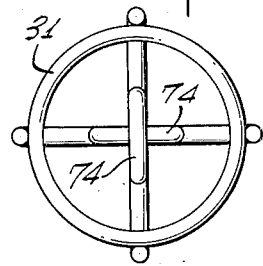
FIG. 10 is a top plan view of the support bracket shown in FIG. 9.

The lower headers 16 are arranged in pairs and carry a plurality of inclined nozzles 18 which direct a high pressure liquid spray upwardly into the inverted cake pan 26 to impart rotation to the latter. The cake pan 26 is pivotally supported on a pan basket generally designated 30 secured to the moving conveyor. Each pan basket 30 has a center pan support 32 which engages the center hole portion 34 of the inverted cake pan. Longitudinally disposed along the length of the conveyor path directly over the upwardly directed washing jets are a pair of guide bars 36 secured together by a cross member 38. These guide bars act to limit upward movement of the pans 26 caused by the lifting force of the spray jets 18. Each of the guide bars is vertically positionable through and adjustment linkage composed of a pivot arm 40 which is movable vertically through a conventional control mechanism generally designated 42. In this manner varying depth cake pans may be cleaned by the machine by the mere repositioning of the guide bars 36 to any suitable height to prevent the high pressure jets from raising the pan off the pivotal support pins 32. The endless conveyor 12 is suitably supported and guided by a pair of opposed angle brackets 28 (FIG. 6). The conveyor 12 carries a plurality of spaced basket-like members 30, as previously mentioned, for rotatably holding each cake pan to be washed. In an alternate form the basket employs an arrow-like center support pin 74 formed from two triangular wire members which are suitably secured to form a pivot-like center structure (FIGS. 9 and 10). This latter form of basket is particularly adapted to mounting cake pans having a larger diameter center hole 34. An upper peripheral basket band 31 acts to restrain any cocking of the pan 26 under washing conditions.

In operation the invention would be loaded at the loading station with soiled cake pans which would be inserted over each basket manually by a machine operator. As the conveyor travel progressed, each pan would be carried above the inclined rotation imparting nozzles 18 which would cause a counterclockwise rotation to be imparted to the cake pan. As the pans progress down the length of the conveyor, each dirty section of the pan is successively subjected to the high pressure nozzle spray to efficiently clean all portions of the inside of the pan. This technique has been found particularly useful in cleansing pans of the angel-food type, wherein the baking residue has been found unusually hard to remove, and not readily accomplished by conventional pan cleaning machines. For this reason, it has been found that higher cleaning efficiency is obtained by rotating the pans and by employing a high pressure 100 p.s.i. water spray at a temperature of 180° F. Prior to reversing direction on the conveyor belt, the spray nozzles terminate to allow the pans to make the turn at the end of the conveyor without being raised off the baskets by the force of the spray nozzles, whereupon reentry to a second stage washing station is made on the return path of the conveyor. Just prior to exit through the aperture 11 near the unloading station 24, a two-step rinsing sequence is entered. For this purpose a U-shaped first rinse supply pipe 56 sprays water in all directions about the pan exiting from the conveyor washing section. The water supply for the first rinse header 56 is obtained from the rinse water sump tank 46 and forced upwardly by a rinse pump 58 to the first stage rinse header 56. Upon leaving the first stage rinse the pans pass through a second stage rinse header 60 which is connected at 62 to a clean water supply. Spaced about the rinse headers 56 and 60 are a multiplicity of spray nozzles 61. The drainage from this second clean water rinse travels down the sloping portion 44 of the housing 10 and is collected in the rinse water sump 46 to be recirculated, as previously mentioned, by the first stage rinse pump 58 to thereby accomplish considerable water saving. The rinse sump 46 is provided with a conventional overflow outlet 64 in the side thereof. A similar wash water conservation is accomplished by recovering the drainage collected by the inclined portion 52 in the wash water sump 48 in the lower portion of the housing 10 from where it may be recirculated in well known fashion to accomplish continued washing.

In the embodiment shown in FIG. 11, a similar washing machine is shown employing the same novel pan holding technique. In this form the loading and unloading stations are disposed at opposite ends of the housing 66. Running along the length of the housing through apertures at either end thereof is a similar conveyor 12 driven by a pair of sprockets 14 which have a horizontal pivotal support axis. The conveyor 12, as in the previous embodiment, carries a plurality of spaced pan holding baskets 30 which permit pivotal rotation of the pan thereon. Just within the housing 66, from the loading station, a plurality of spaced washing header pipes 16 are disposed about the conveyor path to direct high pressure detergent water against the pan in similar fashion as the previous embodiment. Similar rotation imparting nozzles 18 are employed to turn each of the inverted cake pans and it is to be understood that a similar upward limiting pan movement bar 36 is also employed, as in FIG. 2 to prevent the pans from being raised off the baskets 30. Approximately midway along the housing length the pans enter a final elongated rinsing section employing rinse header supply tubes 72 and rotation imparting nozzles 18. In this embodiment the rinsing is accomplished in like manner to the washing under rotary motion imparted to the pans by the inclined jets 18.

Referring to FIGS. 12, 13, 14 and 15 another form of the invention is shown wherein an angel-food pan washer shown generally at 74, is mounted side by side with a conventional flat baking pan washing machine shown generally at 76. Each machine is of the straight line variety having adjacent loading stations 78 at one end thereof and unloading stations 80 at the opposite end. In this embodiment similar elements are designated with like numerals as those used in the previous embodiment. Passing through the angel-food pan washing section 74 is an endless conveyor 12, driven by motor 50, around end support sprockets 14, 14. The companion flat pan washer 76 has a horizontally disposed wire mesh conveyor 96 through which the washing water may readily pass to a pair of sump tanks 86 and 88 below. The wash water sump tank 86 is transversely disposed underneath the conveyors 12 and 96 to collect the wash water discharged from nozzles in the headers 16 and 92 which are respectively supplied by a pair of wash water pumps 82 and 84. The pump 82 delivers wash water at a high pressure and velocity to both the underside and the top side of a typical angel-food pan 26, as in the previous embodiment, so that a rotating motion is imparted to the pan. The wash water headers 92 are displaced both above and below the upper path of the conveyor 96 and are supplied with washing liquid from the low pressure pump 84. Both of the pumps 82 and 84 pump wash water from the sump tank 86, about the pans to be cleaned and recirculate the drainage therefrom. The pans 26 traveling in the section 74 will rotate in similar fashion as in the previous embodiments and are held down upon the baskets 30 by suitable longitudinal bars (not shown). As the pans progress along the irrespective conveyor paths they enter a rining station. The flat pan washer rinsing station is fed in a conventional manner from a rinse water sump tank 88 by a low pressure pump 90 to the headers 94 spaced about the conveyor path. Adjacent this rinse station is an angel-food rinsing area which is supplied by normal supply line pressure through a rotation imparting arrangement of rinse headers 72. Further along each conveyor 12 and 96, respectively, are drying sections wherein a hot air circulates. A drying duct 100 extends transversely across the far end of the conveyor and directs the hot air to the underside of both the housings 74 and 76.

In this form of the invention is can be seen how a compact unitary design has been accomplished by joining a rotating pan angel-food washer to a flat cake pan washer. In this combination a single operator can easily load both types of pans at one end of the machine and thereby effect a substantial labor saving. If these two machines were separate it would be exceedingly difficult to use a single operator to load and manipulate each machine. A further advantage of this novel combination is that the wash water tank 86 is utilized for both machines and the desired washing pressures are obtained by employing both a high and low pressure pump. At the unloading end of the combined washing machine is a similar unitized drying duct extending beneath both conveyor paths to efficiently use a single hot air drying source for the drying of both types of pans.

Thus, it can be seen how the invention has provided an improved pan washing machine which is particularly adapted to those pans employing a center hole coring the member 34. This pan component allows the cooperative engagement with a center guide post on the conveyor basket and allows for the continuous rotation of the pan within the washing chamber. It has been found that pan rotation optimises the cleaning cycle, reducing the number of spray jets required and also improving the cleaning efficiency. Of course, it should be realized that this invention is equally adaptable for washing pans employed for baking fruit cake and any other similar type ring.

While specific embodiments of the invention have been shown and described in detail to illustrate the application of the inventive principles, it will be understood that the invention may be embodied otherwise without departing from such principles.

What is claimed is:

1. A machine for cleaning ring type backing pans having a central hollow cake hole coring member, comprising a housing, conveyor means for transporting baking pans through said housing, said conveyor means including a plurality of spaced non-rotatable upstanding pan supports, said pan supports including an upstanding central member adapted to engage the hollow cake hole coring member of a ring type baking pan placed in inverted fashion thereover, fluid projecting means below said conveyor to direct fluid upwardly to obliquely contact the inside surface of the outer wall of the inverted baking pans, thereby rotating the pans relative to their respective pan supports, and means above said conveyor substantially parallel thereto for limiting upward displacement of the rotating baking pans.

2. Apparatus according to claim 1, wherein each upstanding central member engages the inside of the hollow cake hole coring member and includes a pair of crossed, vertically disposed, inverted V-shaped wire members.

3. Apparatus according to claim 1, wherein each upstanding central member includes a vertically disposed, center pin member adapted to engage the inside of the hollow cake hole coring member.

4. Apparatus according to claim 1, including in addition, first and second baking pan rinse means within said housing, said first rinse means using the water recovered from said second rinse means, said second rinse means employing fresh rinse water.

5. In combination with apparatus according to claim 4, a second pan washing machine placed side by side therewith, said second washing machine comprising a housing, conveyor means for transporting baking pans through said housing, fluid projecting means along said conveyor means for directing washing water against baking pans upon said conveyor means, and single tank means extending below both of said conveyor means for collecting the drainage from said fluid projecting means in each of said pan washing machines.

6. Apparatus according to claim 1, wherein said last mentioned means is vertically adjustable to accommodate various depth baking pans.

References Cited in the file of this patent

UNITED STATES PATENTS

| | | |
|---|---|---|
| 910,882 | Truesdell | Jan. 26, 1909 |
| 1,130,015 | Paul | Mar. 2, 1915 |
| 1,668,955 | Forsberg | May 8, 1928 |
| 1,708,364 | Guignard | Apr. 9, 1929 |
| 2,011,786 | Walker | Aug. 20, 1935 |
| 2,078,699 | Taylor et al. | Apr. 27, 1937 |
| 2,140,589 | Lannmark | Dec. 20, 1938 |
| 2,347,057 | Lakso | Apr. 18, 1944 |
| 2,541,901 | Zademach et al. | Feb. 13, 1951 |
| 2,655,162 | Zademach et al. | Oct. 13, 1953 |
| 2,818,873 | Carlson et al. | Jan. 7, 1958 |